Inventor:
JAKOB DICHTER
BY Smythe & Moore
ATTORNEYS

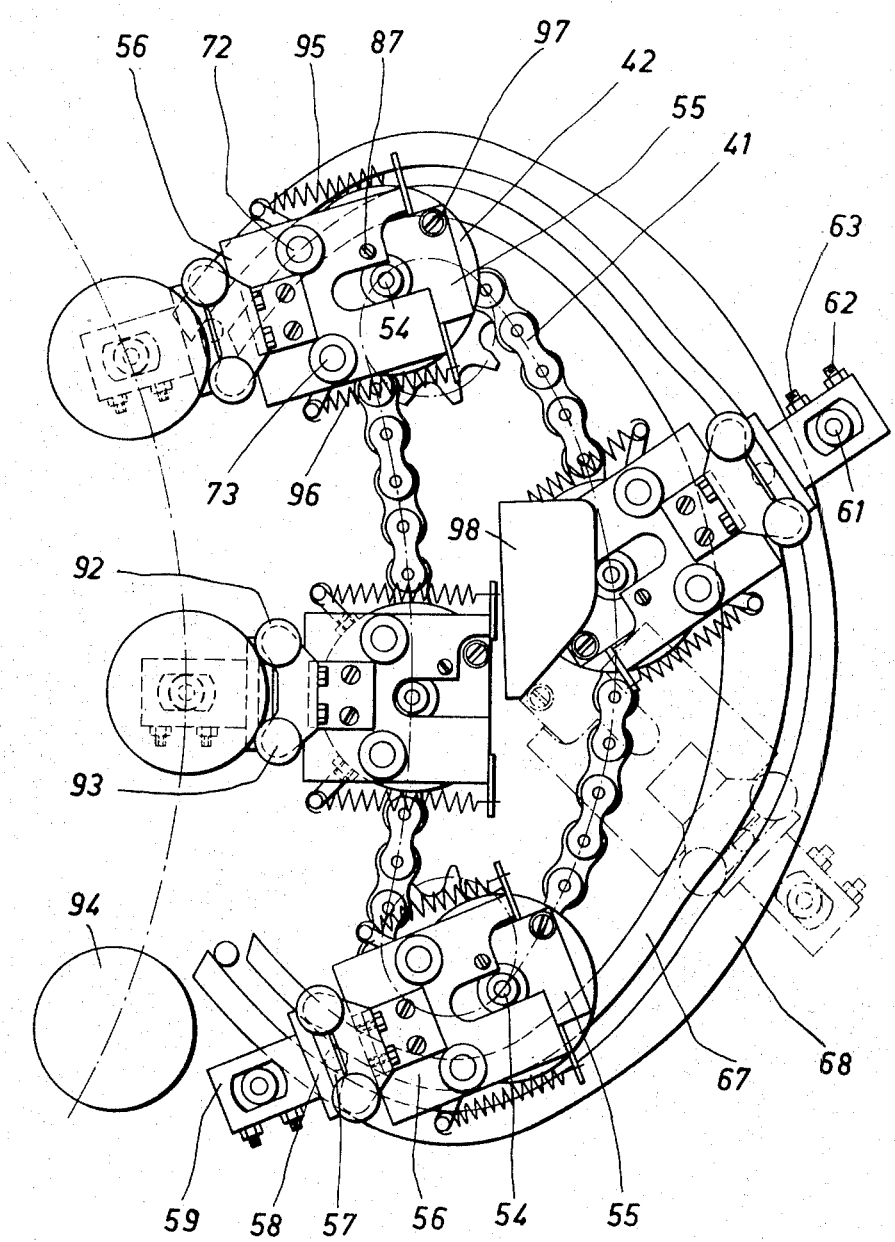

United States Patent Office 3,730,699
Patented May 1, 1973

3,730,699
MACHINE FOR WORKING ARTICLES OF THERMOPLASTIC MATERIALS
Jakob Dichter, Sachsendamm 93, Berlin, Germany
Continuation of application Ser. No. 686,181, Nov. 28, 1967. This application Oct. 27, 1970, Ser. No. 84,548
Claims priority, application Germany, Nov. 29, 1966, D 51,665
Int. Cl. C03b 9/00
U.S. Cl. 65—237                  8 Claims

ABSTRACT OF THE DISCLOSURE

A machine for working thermoplastic articles having a carriage for carrying the articles to be worked and an endless conveyor on which tools may be carried, each tool being arranged to work over a working path, for a respective article as it is conveyed on the carriage. The working path may be arranged to be longer than the spacing between the articles.

---

This is a continuation of Ser. No. 686,181, filed Nov. 28, 1967, now abandoned.

The invention relates to a machine for working articles of thermoplastic materials, particularly glass, for example, in which articles heated by burners, for example, are conveyed by work-holders along a prescribed path past toolholders holding tools which perform working operations on the articles.

Machines of this kind may be used for the production from glass tubes of small bottles intended for holding medicines or the like.

According to the invention there is provided a machine for working articles of thermoplastic materials comprising carriage means having work-holders for carrying respective articles which are to be heated and worked; an endless conveyor; and a plurality of toolholders spaced apart on the conveyor to be carried thereby, the arrangement being such that the conveyor may be moved continuously in the same direction to convey the toolholders in a working path adjacent the path of the work-holders at the same speed and in the same direction thereas, a tool held by each toolholder being allowed to cooperate along the working path with a respective article held in a work-holder.

Preferably the conveyor carries at least three, and conveniently four, toolholders and the working path is longer than the spacing between adjacent work-holders.

In a particularly advantageous embodiment of the invention the tools cooperating with an article are guided at a constant distance from the work-holder. This distance can be satisfactorily kept constant in two different ways. A first possible method consists in maintaining the constant distance between the work-holder and the working tool along the working path by guide means which positively guide the conveyor means along a track which is parallel to the path of the carriage for the articles. In such an arrangement the paths of the articles and of the tools must be carefully brought into parallelism. Difficulties in making the necessary adjustments can be avoided by adopting a different arrangement in which the constant distance between the work-holder and the working tool along the working path is maintained by spacer means which cooperate with parts of the respective work-holders. In this second alternative the tool will therefore automatically adjust itself to the correct distance from the work-holder.

In a preferred embodiment of the proposed machine the conveyor means has a plurality of supports each carrying a toolholder adapted to swivel and comprising a guide-plate rotatable on said support and a slide reciprocable in the guide-plate and carrying at least one swivelling toolholder arm for one or more tools.

Conveniently the toolholder may comprise two locating elements which cooperate with parts of respective work-holders and thereby provide a two-point location for the toolholder whilst this travels along the working path, as well as a guide pin guided in a cam track along the remaining, or return, part of said path.

The conveyor may usefully consist of a chain travelling around at least two sprockets. Between the sprockets the chain may be guided by chain guides which operate to adapt the path of the chain to that of the articles, particulraly when the latter is circular.

Preferably the number of toolholders provided at equidistant intervals on the conveyor is divisible by the number of work-holders on the carriage, so that each toolholder will work on the same group of work-holders.

Preferably there is provided a graduated table in association with the circulating track of the toolholders for the purpose of adjusting the several toolholders.

The invention will further be described with reference to the accompanying drawings, of which:

FIG. 9 is a plan view of the part of the machine shown in FIG. 4.

Figure 1:
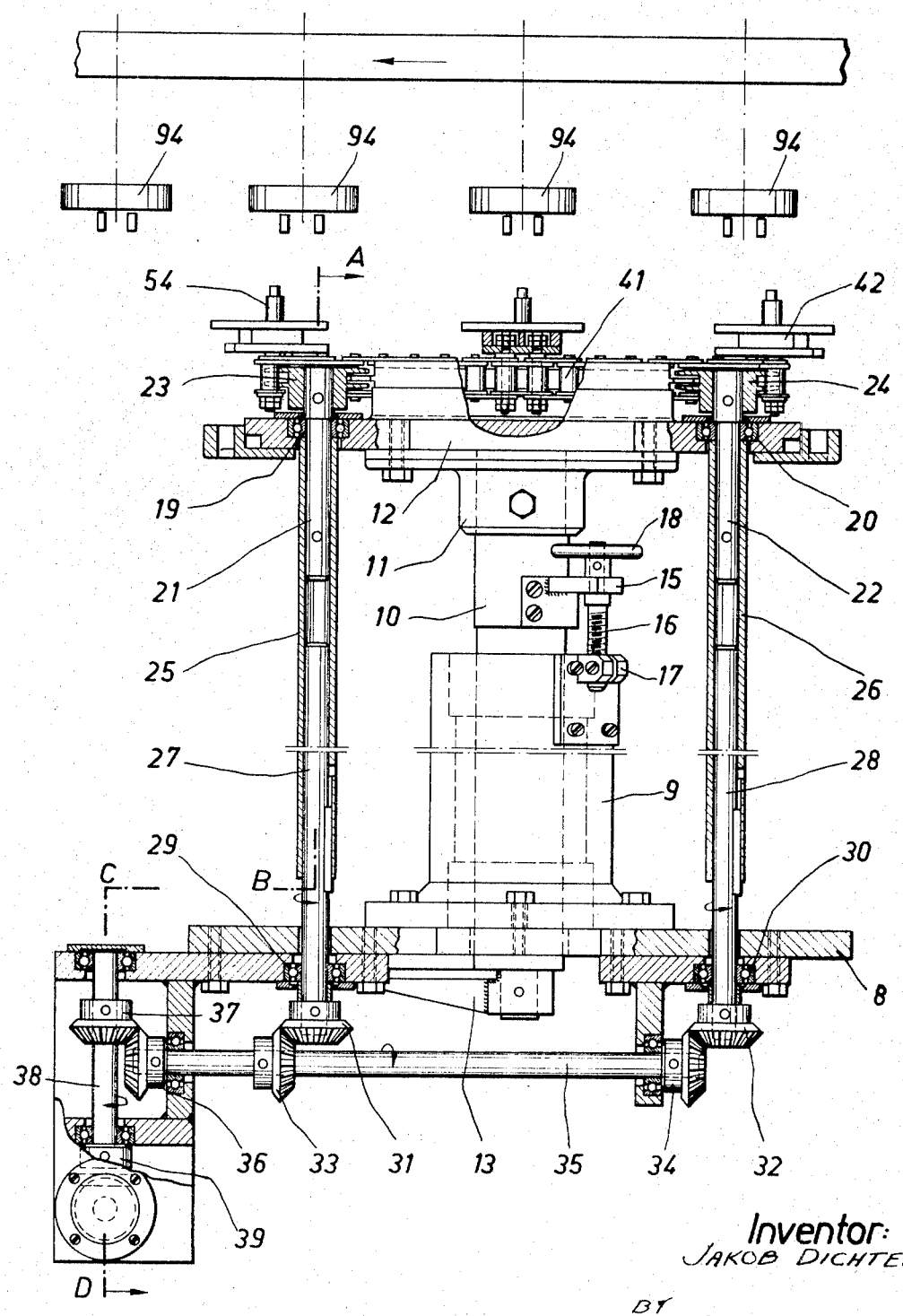
FIG. 1 is a front elevational view of the principal parts of a machine according to the invention.
Figure 2:
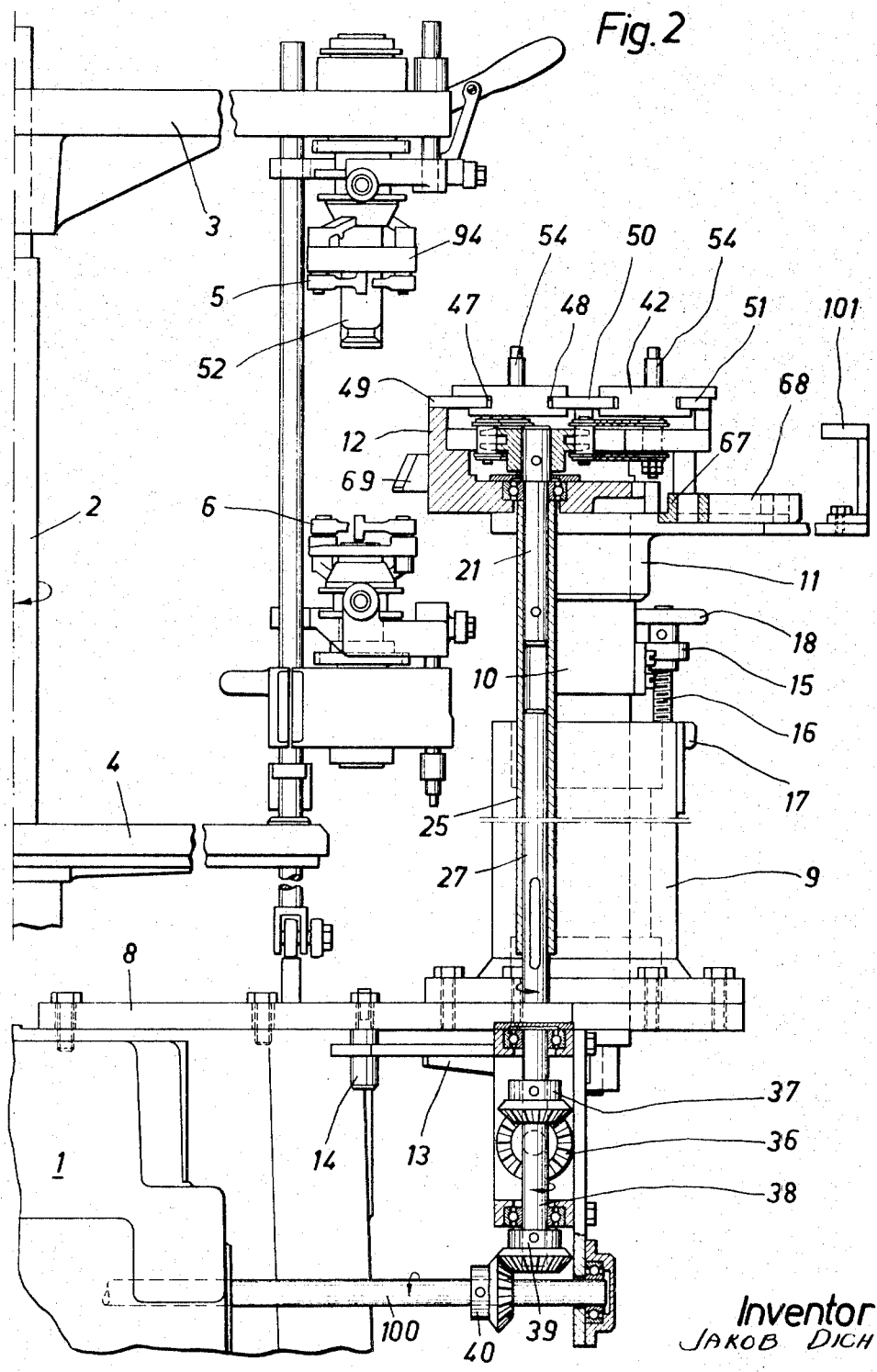
FIG. 2 is a sectional side elevation on the line A–D in FIG. 1.
Figure 3:
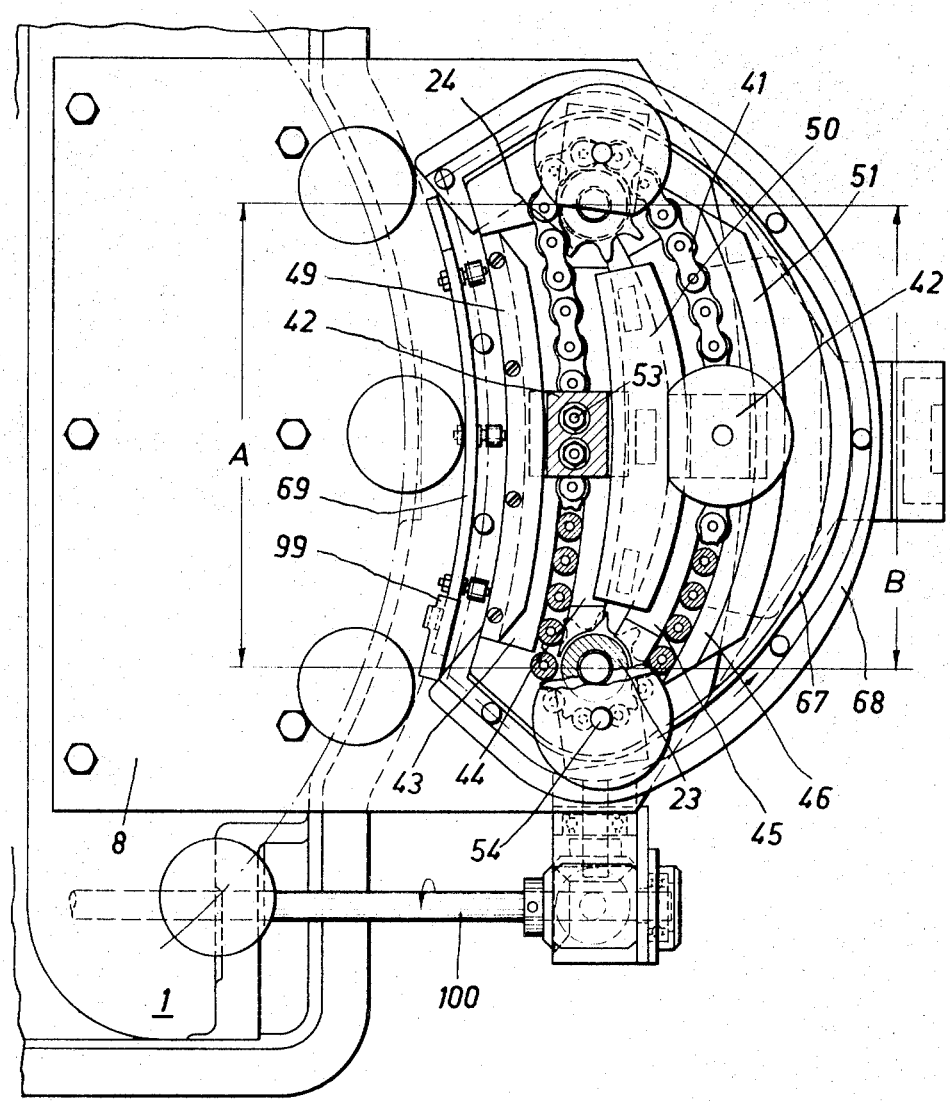
FIG. 3 is a plan view of parts of the machine.
Figure 4:
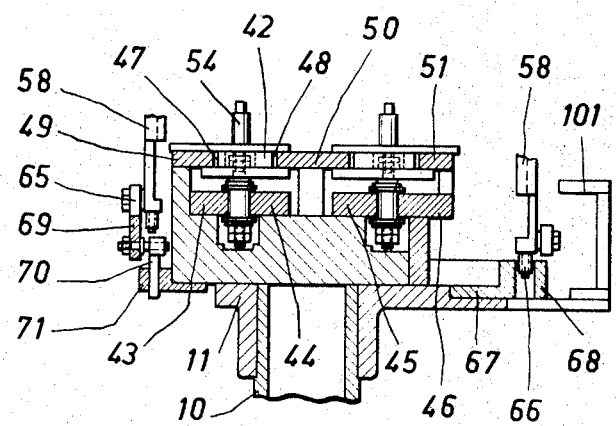
FIG. 4 is a section taken on the line E–F in FIG. 3.

Referring to the drawings the machine comprises a frame 1 carrying a revolving turret head 2 which on arms 3 and 4 carries work-holders generally indicated by reference numbers 5 and 6. An arm 8 is fixed to the frame and carries a pedestal bearing 9 for a hollow shaft 10 which at its upper end supports a baseplate 12 on a flange 11. A lever 13 fixed to the bottom end of the hollow shaft 10 has a hole (not shown) which registers with a pin 14 and prevents the hollow shaft from rotating in its pedestal bearing 9.

For elevational adjustment of the baseplate 12 the hollow shaft 10 carries a bearing 15 for a screw shaft 16 which works in a nut 17 affixed to the pedestal bearing 9, and which can be rotated by a handwheel 18 to raise or lower the hollow shaft a required distance in its pedestal bearing 9.

Let into the baseplate 12 are bearings 19, 20 for axles 21 and 22 each of which carries a sprocket 23 and 24 respectively. The axles 21 and 22 are rotationally connected by sleeves 25 and 26 to shafts 27 and 28 which are mounted in bearings 29 and 30 in arm 8, and which carry bevel gears 31 and 32 at their bottom ends. The shafts 28 and 29 are telescopically movable in the sleeves 25 and 26 to permit the baseplate 12 to be raised or lowered in relation to arm 8.

The bevel gears 31 and 32 mesh with bevel gears 33 and 34 which are both fast on a shaft 35. Affixed to the end of this latter shaft is a further bevel gear 36 meshing with a bevel gear 37 on a layshaft 38 which in turn carries a bevel gear 39 meshing with a bevel gear 40 on a shaft 100 drivable by a motor, not shown, for powering the machine.

The sprockets 23 and 24 drive a chain 41 which carries four supports 42. The chain is guided in a horizontal plane by the edges of guide plates 43, 44, 45 and 46, each of the two portions of chain between the two sprockets being guided between two of said edges. In order to prevent the supports 42 from tilting they are provided with slots 47 and 48 slidably engaged by guide rails 49, 50 and 51.

The guiding edges of plates 43 and 44 are shaped to guide the length of chain travelling within the region marked A at a constant radial distance from the workholders 5 and 6 and hence from work 52 held thereby. The length of the chain 41 is such that work can be done simultaneously on more than one workpiece. The sections of chain between consecutive supports 42 are of equal length. This means that the number of links comprised in the chain is a multiple of four. Each support is attached to two consecutive link pins 53.

The supports 42 carry pivot pins 54 for mounting swivelling guideplates 55 for slides 56. The end of each slide 56 remote from the pivot pin 54 carries a vertical guide 57 on which is slidably mounted a slide 58 with an arm 59 supporting a sliding block 60 carrying a forming mandrel 61. The sliding block 60 is adjustable in the arm 59 and is fixed by means of locking screws 62 and 63. A screw 64 serves for locating the mandrel 61. Mounted on the bottom end of the slide 58 is a first guide roller 65 which determines the height of the slide 58 and a second roller 66 which guides the slide 56 between guiding plate edges 67 and 68 along part of its endless path. The bottom limit position of the slide 58 is determined by a stop 7. Otherwise the position of slide 58 is controlled by engagement of roller 66 on a rail 69 supported by a mount 70 which is held in a bracket 71 fixed to the baseplate 12. The height of mount 70 is adjustable.

Figure 5:
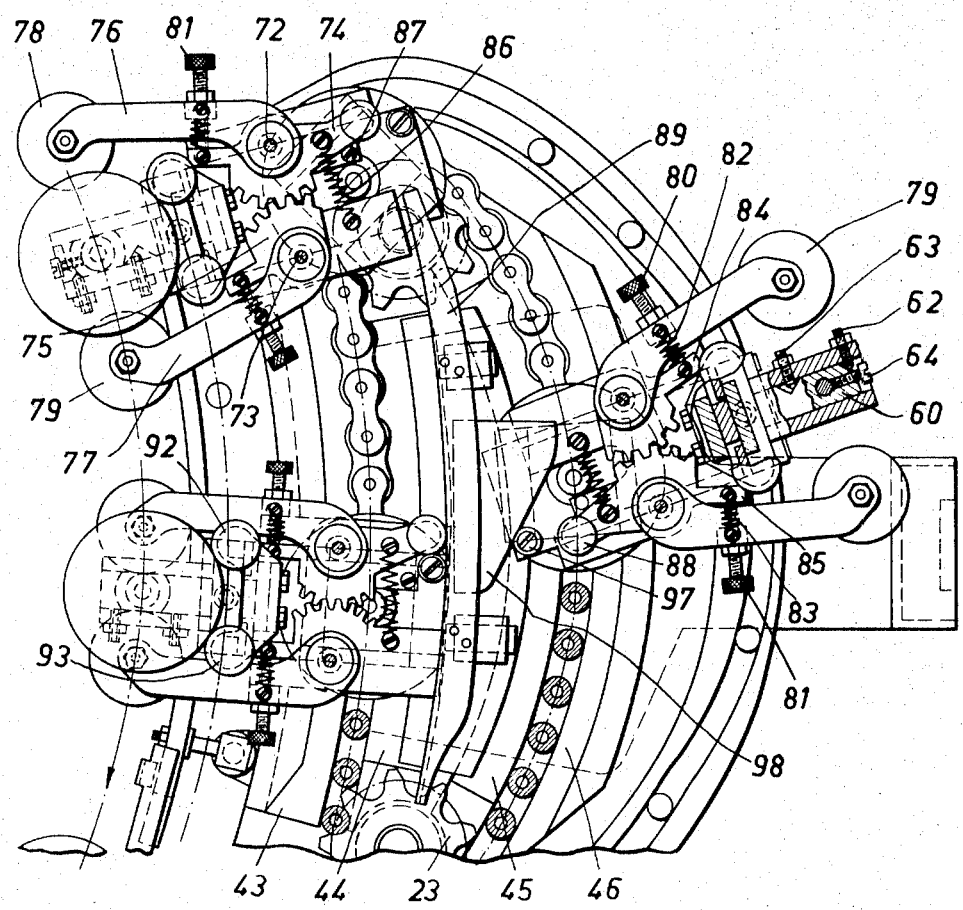
FIG. 5 is a plan view of the machine showing the toolholder in position.
Figure 7:
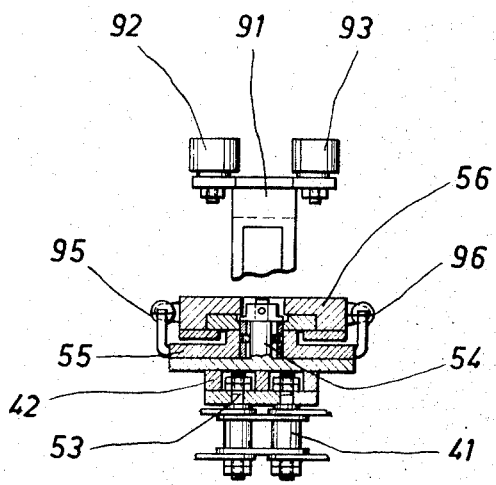
FIG. 7 is a section of a toolholder showing details thereof.

Mounted on the top of each slide 56 are further pivot pins 72 and 73 for gear quadrants 74, 75 and cantilever arms 76 and 77 which at their ends carry tools constituted by forming rollers 78 and 79. Setscrews 80 and 81 work in the arms 76 and 77 for urging the ends of springs 82 and 83 against extensions 84 and 85 on the gear quadrants. A spring 86 between the gear quadrant 74 and the slide 56 pulls the gear quadrants to urge the arms 76 and 77 apart. The angular separation of the arms is limited by a stop 87. For the purpose of moving the tools 78 and 79 into working position the gear quadrant 74 carries a guide roller 88 which bears a guide bar 89 as the tools travel along their working paths and thereby moves the tools into the position illustrated at the lower left-hand side of FIG. 5. The height of the two arms 76 and 77 is adjustable by screws 90.

The upper end of a plate 91 attached to each slide 56 rotatably carries two rollers 92 and 93 which are adapted to cooperate with a collar 94 on the work-holder 5 to provide a two-point location. The rollers 92 and 93 are kept in contact with the collar 94 by tension springs 95 and 96 which are attached on the one hand to the guide plate 55 of the slide and on the other hand to the slide 56, and which therefore operate to urge the slide 56 outwards away from the chain 41. It will be understood that the outward displacement of the slide 56 in the region of the chain track where the rollers 92 and 93 do not make contact with the collar 94 must be limited. This is effected by the roller 66 riding between the guiding edges 67 and 68.

The primary purpose of the guiding edges 67 and 68 is to control engagement with and disengagement from the work of the tools. This purpose can be most conveniently accomplished if the guide roller 66 is first trailed into the return track defined by the edges 67 and 68 after the work has been released by the tools and the baseplate has passed over the sprocket 23. However, it is then advisable to rotate the guide plate 55 of the slide on its mount 42 thereby to push the roller 66 through the following section of the track. In order to impart this rotary motion to the guide plate bearing the slide, the guide plate is provided with a roller 97 which strikes a cam member 98 located roughly at the midpoint of the return track and thus operates to deflect the slide 56 out of the position shown in chain lines in FIG. 9 into the position shown in full lines. Within range of this swivelling motion of the slide, edges 67 and 68 are outwardly arched to conform with the swivel radius of the slide 56.

Figure 6:
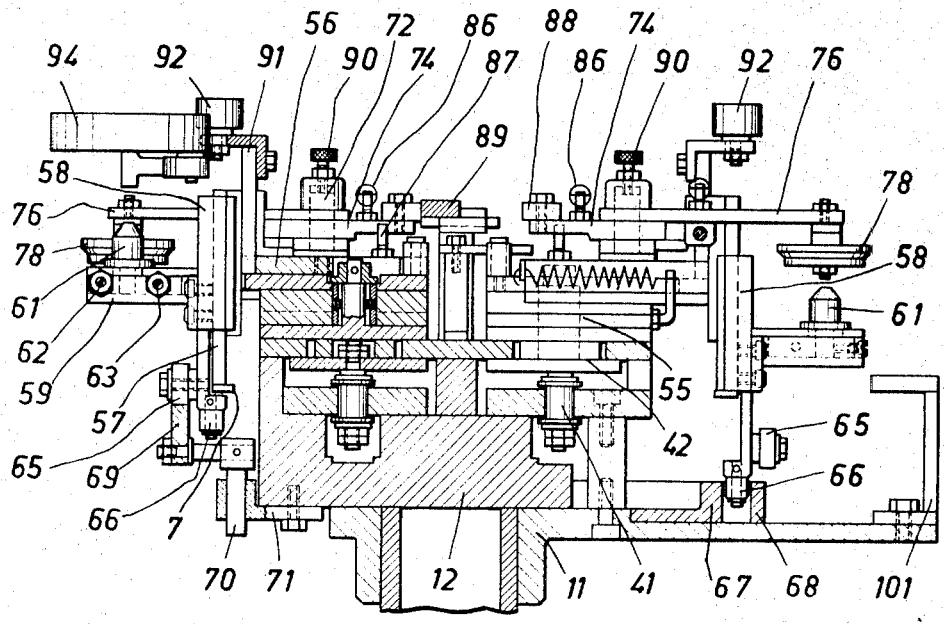
FIG. 6 is a section of the machine parts of FIG. 5 taken on a line corresponding to E–F (FIG. 3)

The described machine functions as follows: The chain 41 is driven by the sprockets 23 and 24 at a speed which ensures that the supports 42 will travel at the same speed as the work whilst a workpiece 52 is being shaped. The correct swivel motion of the slide 56 into working position is controlled by the corresponding end of the cam track defined by the guiding edges 67 and 68. In the position of the slide shown at upper left in FIG. 5 the arms 76 and 77 are still widely separated and the forming mandrel 61 is in its lower position as illustrated in FIG. 6 on the right. During the continued motion of the support 42 and of the elements which it carries the guide roller 66 is released by the guiding edges 67 and 68. This is permissible because the slide 56 is now held by the rollers 92 and 93 bearing against the collar 94 of the upper work-holder 5. At the same time the roller 65 rides on to the rail 69 and guides the mandrel 61 from below into the neck of the work 52.

Figure 8:
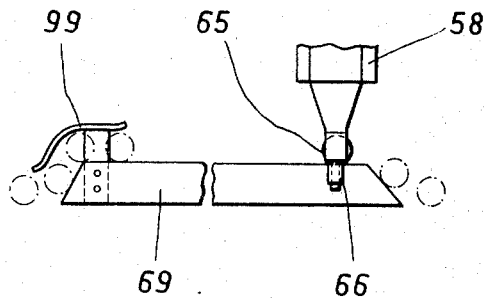
FIG. 8 is a detail illustrating the manner of control of a mandrel for the reception of the workpiece.

Roller 88 engages against the guiding edge 89 to deflect the gear quadrants 74 and 75 against the resistance of the spring 86 and the tools 78 and 79 are thus brought into their working position. The several elements of the mechanism move into the positions illustrated in FIG. 5 at bottom left. Shortly before reaching the sprocket 23 the roller 65 is again moved downwards by an auxiliary guiding element 99 (FIG. 8) thereby causing the forming mandrel to be withdrawn from the neck of the work 52. The roller 88 is then disengaged from the edge 89, permitting the arms 76 and 77 to reopen, the support being carried by the chain into the return track. The toolholder elements can thus be brought consecutively into engagement with the work.

What is claimed is:

1. A machine for forming hollow thermoplastic articles, comprising a rotatable turret having a series of radially extending spaced supporting arms for carrying said articles through a circuitous path and at least one work performing station located outside the periphery and parallel to said circuitous path, means for rotating said turret, said work performing station including support means spaced from said turret and said article holding means, a horizontally arranged conveyor carrying plate on the upper end of said support means, spaced driven shafts depending vertically through said plate, sprocket means mounted on said shafts, endless chain conveyor means mounted on and driven by said sprockets and arranged above and supported for guiding movement relative to said conveyor carrying plate, means for rotating said spaced shafts interconnected and driven by said turret driving means whereby said conveyor is continuously rotated at the same speed and in the same direction and in said circuitous path generally parallel to that through which said articles are moved by said turret, at least three tool holding units spacedly mounted on said chain conveyor means, each unit being pivotally mounted relative to said article holding means and said article, said units comprising swivelling guide plates pivotally mounted on said conveyor means, slide means slidingly attached to said swivelling plates and horizontally spaced arms pivotally mounted on said slide means, forming roller means on one end of said arms, means at the other end of said arms for movement of said arms in opposed directions comprising a roller mounted on one end of said arms bearing against cam means on said conveyor plate mounted relative to the circuitous path through which said articles are moved by said turret, whereby each of said forming roller means engage with the annulus of a hollow article on said turret during simultaneous rotation of said turret and said chain conveyor means, each of said units successively engaging hollow articles at and as they are rotated past said work performing station, and aligned spacer means for providing a constant distance between said tool holding units and said article holding means.

2. A machine as claimed in claim 1 wherein said work performing station support means is vertically adjustable, said spaced driven shafts are telescopic relative to each other, said tool holding units each comprising a pair of horizontally spaced arms, the means at the said other end of said arms is for movement in opposed directions and said roller is mounted on one of said arms.

3. A machine as claimed in claim 2 wherein there are four toolholding units spaced evenly around the conveyor.

4. A machine as claimed in claim 2, wherein spacer means comprising a pair of horizontally spaced rollers mounted on said toolholding units communicate with a collar on said article holding means during their movement through said work performing station to maintain a constant distance between said toolholding units and said article holding means.

5. A machine as claimed in claim 2 wherein the toolholding units are mounted to rotate about a pivot axis on mounts fixed to the conveyor, each toolholding unit having two locating elements which cooperate with parts of the respective article holding means during their movement through said work performing station to constitute a two-point location to prohibit rotation of the toolholding unit, each toolholding unit having a guide pin offset from the pivot axis, which pin travels in a guide channel in said conveyor carrying plate over the remainder of the endless path of said chain conveyor.

6. A machine as claimed in claim 5 wherein, for each toolholding unit the guide pin enters the guide channel trailing the pivot axis and leaves the guide channel leading the pivot axis, means being provided in the return path of the path for engaging part of the toolholding unit to cause it to pivot about its pivot axis.

7. A machine as claimed in claim 2 wherein each toolholding unit comprises a mount for a mandrel holder which is slidable on its mount in a direction perpendicular to the plane including the path of the conveyor.

8. A machine as claimed in claim 7, wherein the position of the mandrel holder on its mount during its movement through said work performing station is determined by a cam surface with which the mandrel holder cooperates.

References Cited

UNITED STATES PATENTS

| | | | |
|---|---|---|---|
| 2,011,187 | 8/1935 | Ruwe | 65—237 |
| 2,081,857 | 5/1937 | Howard | 65—244 |
| 1,852,171 | 4/1932 | Lubb | 65—232 |
| 2,391,963 | 1/1946 | Gray | 65—240 X |
| 3,424,570 | 1/1969 | Couquelet | 65—108 X |
| 3,472,643 | 10/1969 | Ogle | 65—109 X |

FRANK W. MIGA, Primary Examiner

U.S. Cl. X.R.

65—244, 268, 272, 323, 361